Dec. 5, 1967     R. WIMMER     3,356,253

PLUMBING FIXTURE AND METHOD OF MANUFACTURING THE SAME

Filed Sept. 2, 1964

United States Patent Office 3,356,253
Patented Dec. 5, 1967

3,356,253
PLUMBING FIXTURE AND METHOD OF
MANUFACTURING THE SAME
Robert Wimmer, Traungasse 14, Wels, Austria
Filed Sept. 2, 1964, Ser. No. 393,926
Claims priority, application Austria, Sept. 6, 1963,
A 7,179/63
13 Claims. (Cl. 220—83)

ABSTRACT OF THE DISCLOSURE

A bath tub or similar plumbing fixture consisting of a polymethacrylate liner and on outer coating of glass-fiber reinforced cured polyester resin is produced by deep drawing polymethacrylate sheeting into the shape of the liner, spraying a coating of polyester resin on the outer surface of the deep-drawn body, embedding glass fiber fabric in the sprayed coating, and curing the coating.

---

This invention relates to plastic plumbing fixtures and to a process of manufacturing the same.

Wash-basins, bath-tubs, shower trays and similar plumbing fixtures are made in most cases of sheet metal, which may be enamelled. It is also known to make bath-tubs and the like from polyester resin, which is reinforced with glass fibers. The tubs or tublike articles were manufactured theretofore by applying one or more layers of the unsaturated polyester resin, and glass fiber material to a male mold, and curing the applied material. Because a certain minimum time is required for curing and the structure cannot be removed from the mold before it is cured, the process takes a relatively long time, and many molds must be available when a higher production rate is desired.

It is an object of the invention to accelerate the manufacture of wash-basins, bath-tubs, shower trays or the like from plastics and consequently to reduce their cost.

The process according to the invention resides in suitably shaping a hollow body from sheeting of thermoplastic synthetic material, such as polymethacrylate, preferably by vacuum deep-drawing, and coating the outer surface of the hollow body in a known manner with a thermosetting synthetic material, preferably an unsaturated polyester resin reinforced with glass fibers. The hollow bodies can be made in a quick and simple manner by deep drawing. A thermoplastic hollow body, however, is not suitable for use as a plumbing fixture because wash-basins and the like must withstand elevated temperatures. The subsequently applied outer coating of polyester or other thermosetting resin when cured provides strong support at elevated temperature to the thermoplastic synthetic body or liner which replaces the previously required molds. Hence, the liners ejected in short intervals from the vacuum deep-drawing apparatus can be coated in continuous operation with the thermosetting plastic and can then be stored and allowed to cure without delaying manufacture.

The tublike hollow liner deep-drawn from synthetic thermoplastic material is spray-coated with a fluid polyester resin composition. Then a woven fabric of glass fibers is applied to the coating. Under pressure and sprayed with another layer of polyester resin. Air entrapped between the coating and the glass fabric is squeezed out by means of rollers.

An embodiment of the invention is shown in the accompanying drawings, in which

Figure 1:
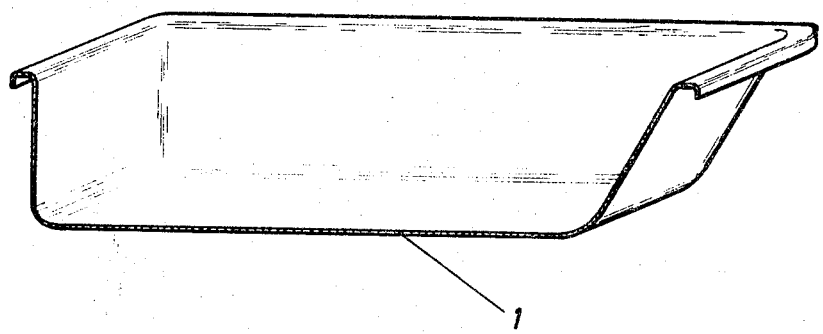
Figure 2:
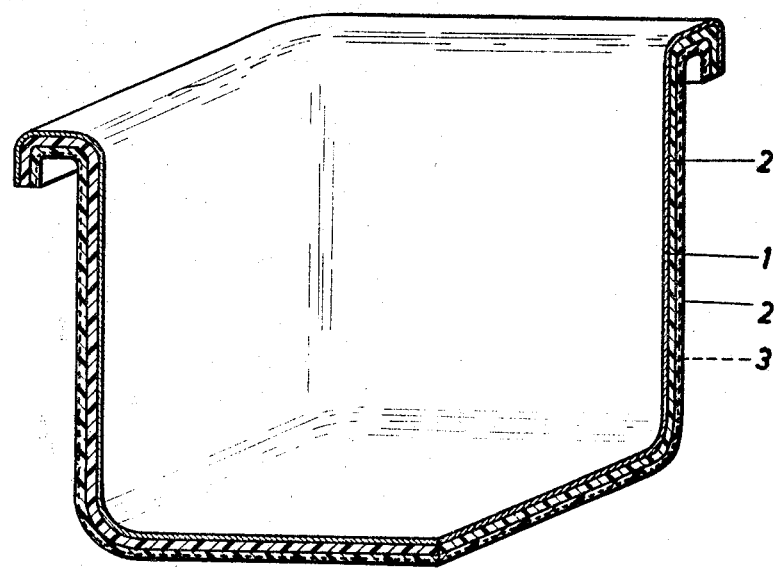

FIG. 1 is a perspective longitudinal sectional view of a base layer for a bath-tub, FIG. 2 is a view similar to FIG. 1 of the finished bath-tub.

The exposed inner or lining layer 1 shown in FIG. 1 is shaped in the form of a bath-tub by vacuum deep drawing from polymethacrylate sheeting. After being removed from the vacuum deep drawing apparatus, it is spray-coated with two outer layers 2 of thermosetting polyester resin. A glass fiber fabic 3 is applied to the thermosetting material while the same is still soft and is pressed into the plastics material until it is embedded in it.

The invention is not restricted to the above-mentioned synthetic thermoplastics and thermosetting materials but any combination of synthetic thermoplastic material and thermosetting plastics which are capable of being bonded to each other may be used.

I claim:

1. A plumbing fixture defining an open-topped cavity comprising:
   (a) an inner layer of synthetic thermoplastic resin material substantially coextensive with and exposed in said cavity; and
   (b) a coating essentially consisting of a cured thermosetting plastic and glass fibers embedded in said plastic,
       (1) said coating covering said inner layer and being bonded thereto.

2. A plumbing fixture as set forth in claim 1, which is in the form of a wash-basin.

3. A plumbing fixture as set forth in claim 1, which is in the form of a bath-tub.

4. A plumbing fixture as set forth in claim 1, which is in the form of a shower tray.

5. A plumbing fixture as set forth in claim 1, in which said synthetic thermoplastic material essentially consists of polymethacrylic ester.

6. A plumbing fixture as set forth in claim 1, in which said thermosetting plastic is an unsaturated polyester.

7. A plumbing fixture as set forth in claim 1, in which said coating comprises a plurality of layers of said thermosetting plastic, said fibers being embedded in one of said layers, and the other layer being substantially free of said fibers.

8. A process of manufacturing a plumbing fixture which comprises:
   (a) shaping synthetic thermoplastic sheeting into a hollow body defining an open-topped cavity therein;
   (b) applying to the outer surface of said body a fluid coating composition including a thermosetting plastic;
   (c) embedding reinforcing glass fibers in said coating; and
   (d) curing said coating.

9. A process as set forth in claim 8, in which said sheeting is shaped by vacuum deep drawing.

10. A process as set forth in claim 8, in which said sheeting essentially consists of polymethacrylate.

11. A process as set forth in claim 8, in which said thermosetting plastic essentially consists of unsaturated polyester.

12. A process as set forth in claim 8, in which said coating is applied in a plurality of layers.

13. A process of manufacturing a shaped article from plastic, which comprises vacuum-forming synthetic thermoplastic sheeting to form a self-supporting body defining an open-topped cavity therein, spraying thermosetting plastic material on the outer surface of said body to form a coating thereon, embedding reinforcing glass fibers in said coating, and curing said thermosetting plastic material.

References Cited

UNITED STATES PATENTS 2,590,221   3/1952   Stevens.
2,695,256   11/1954  De Olloqui et al.

THERON E. CONDON, *Primary Examiner.*

JAMES B. MARBERT, *Examiner.*